United States Patent [19]

Reverdv

[11] Patent Number: 4,913,710

[45] Date of Patent: Apr. 3, 1990

[54] MODULAR COOLING TOWER

[75] Inventor: Francois R. Reverdv, Reisterstown, Md.

[73] Assignee: Baltimore Aircoil Company, Inc., Jessup, Md.

[21] Appl. No.: 350,257

[22] Filed: May 11, 1989

[51] Int. Cl.$^4$ .......................... B01D 47/06; B01F 3/04
[52] U.S. Cl. ...................................... 55/257.1; 55/440; 261/DIG. 11
[58] Field of Search ............. 55/84, 440, 257.1, 257.2; 261/108, DIG. 11

[56] References Cited

U.S. PATENT DOCUMENTS 3,065,587 11/1962 Fordyce et al. ........ 261/DIG. 11 X
4,781,869 11/1988 Wiltz ...................... 261/DIG. 11 X Primary Examiner—Charles Hart
Attorney, Agent, or Firm—Charles E. Bouton; Edward J. Brosius

[57] ABSTRACT

A modular cooling tower assembly is provided that comprises at least one cooling tower module having extendible legs capable of supporting the assembly when fully extended. When more than one cooling tower module is used in the assembly, adjacent modules are attached together at their respective frames. A single exit plenum chamber is placed over the joined modules and a single fan in the exit plenum chamber causes an air intake from an air entrance plenum chamber at the bottom of the modules upwardly past the fill sheets and out the exit plenum chamber and fan cowl. The cooled liquid falls into a common collection basin in which the extended legs of the modules are standing.

22 Claims, 5 Drawing Sheets

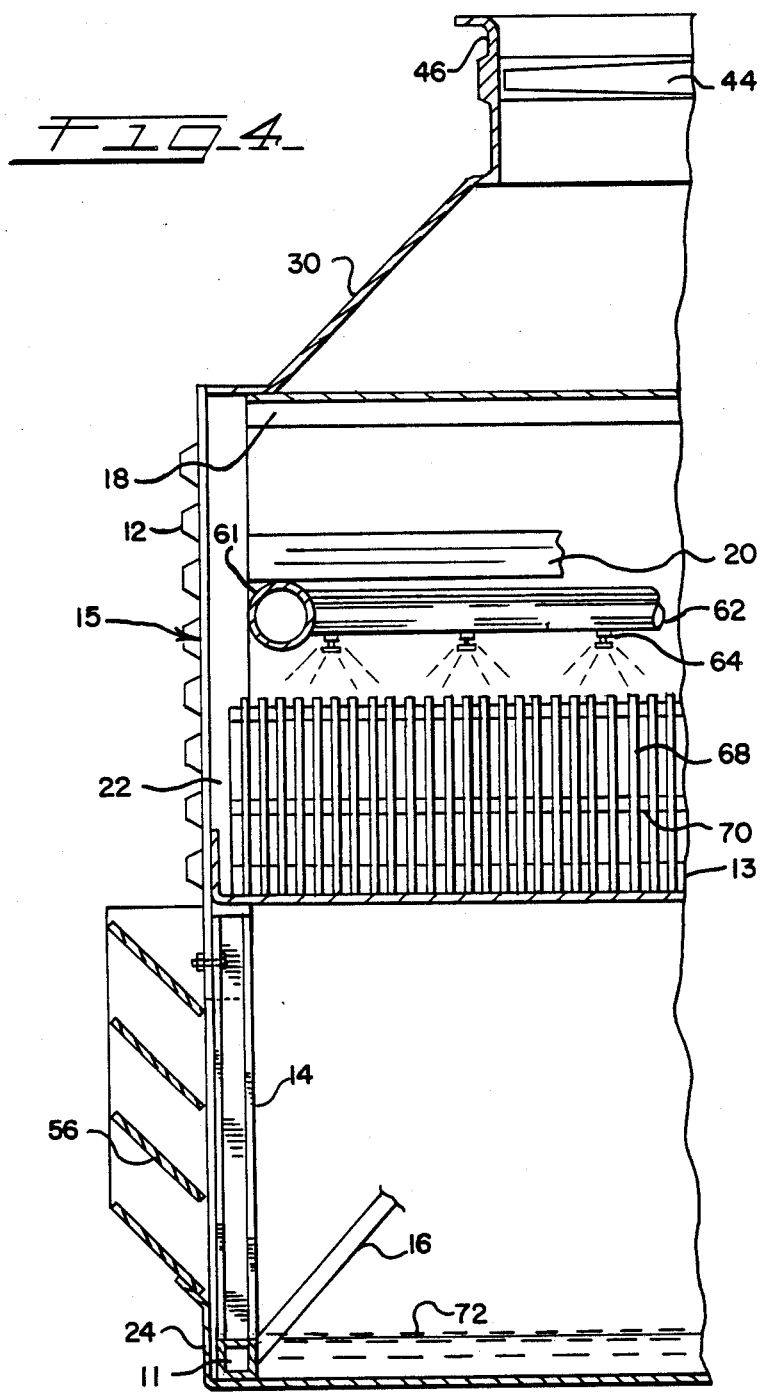

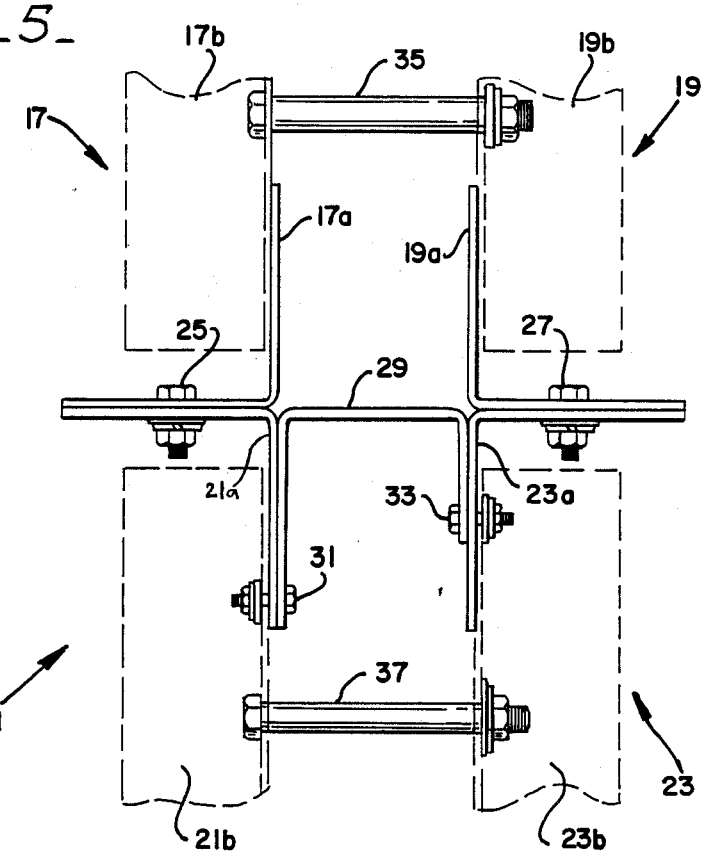
FIG_5_
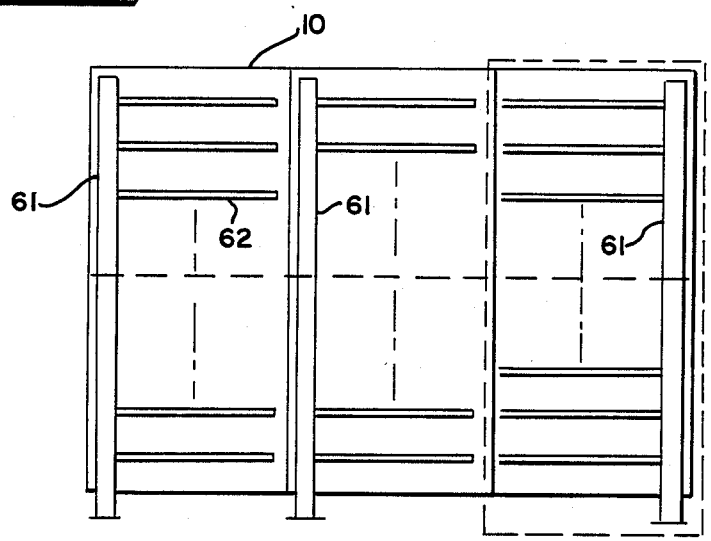
FIG_6_

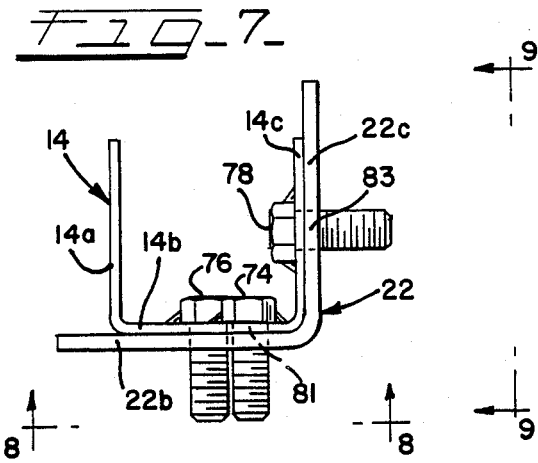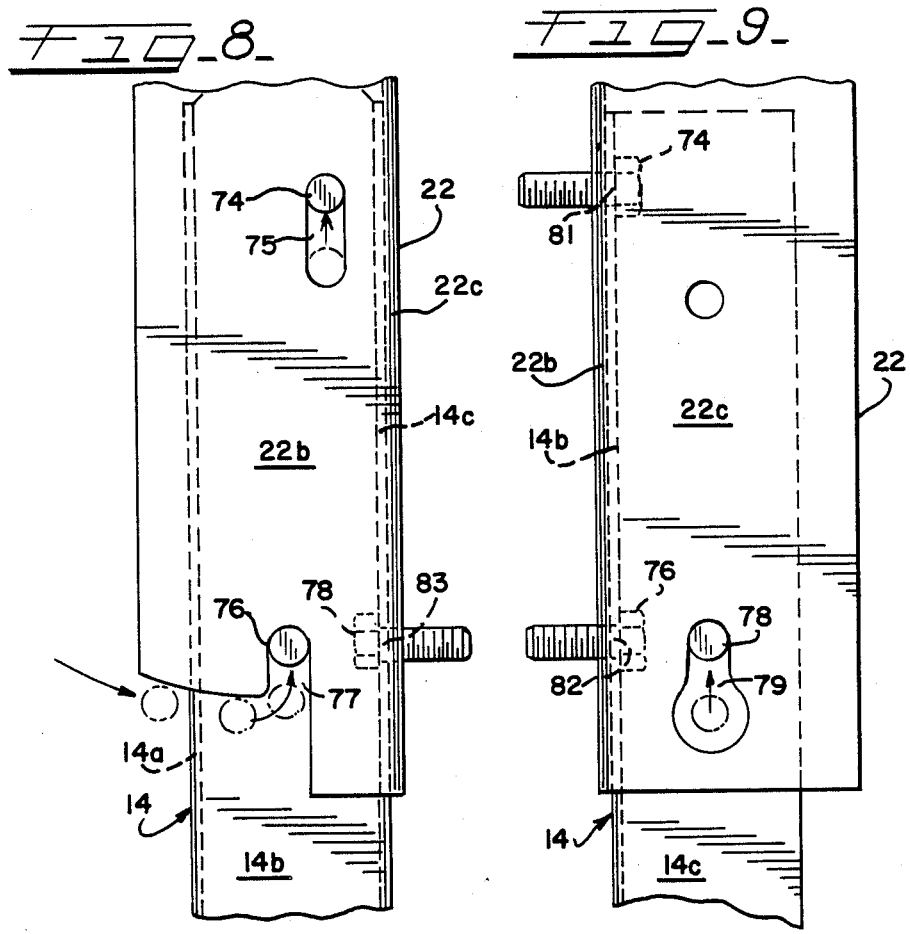

MODULAR COOLING TOWER

BACKGROUND OF THE INVENTION

The present invention relates to cooling towers and, more particularly, to modules capable of being combined to form a modular counterflow cooling tower.

One use for cooling towers is to transfer heat from a liquid to the air. In essence, the liquid is cooled. Typically, the liquid has acquired heat in an industrial process or in an air conditioning or other commercial operation, and heat is required to be removed from the liquid so it can reenter the process to again absorb heat. In a counterflow cooling tower, the liquid to be cooled is usually water and is sprayed downwardly from a header onto fill sheets. The fill sheets are relatively closely packed sheets of plastic utilized to spread the water flow over their surface. Air is drawn upwardly past the fill sheets usually by a fan located above the spray header. The upward flow of air and downward flow of liquid results in the counterflow designation of the cooling tower. The liquid is cooled by the passage of air across the fill sheets, and the cooled liquid falls into a collection basin from which it is recycled.

One problem with such cooling towers is the ability to match the cooling capacity of a factory built cooling tower to the commercial process needs. Several sizes for the cooling towers are necessary to meet various needs, with the only ready option being the ability to use multiples of a particular size cooling tower unit to meet such needs.

Another problem in such arrangements is the physical size of cooling towers. Construction locations are frequently in downtown urban settings that require the delivery of all construction elements by semi-trailer truck. Size limitations on truck shipments dictates a maximum size of container or, in this case, cooling tower, that can be readily shipped. This problem can be summarized by saying that it is difficult to supply the various cooling tower capacities that may be required without supplying many different sized complete cooling towers or two or more of tha available size cooling towers, and in any event duplicating many parts such as fans and pumps, and the like.

SUMMARY OF THE PRESENT INVENTION

Accordingly, an object of the present invention is to provide a cooling tower module and a method for erecting a modular cooling tower assembly.

A further object of the proposed invention is to provide a modular cooling tower assembly where each cooling tower module includes extendible support means at the bottom of the module, thereby substantially reducing its overall height for shipping.

Another object of the proposed invention is to provide a modular cooling tower assembly which includes a single exit plenum chamber and fan, a single entrance plenum chamber and a single collection basin, all adapted to be integrated with the multiple cooling tower modules, thereby reducing the amount of parts and labor required for the on-site construction of the assembly.

By the present invention, it is proposed to overcome the difficulties encountered heretofore. To this end, it has been discovered that multiple cooling tower modules may be combined and attached as necessary in a side by side arrangement to form a modular cooling tower assembly which can be operatively serviced with a single exit plenum chamber, fan, entrance plenum chamber and collection basin. The modular cooling tower assembly may be varied in design to have a cooling capacity equal to or slightly greater than the needs of the commercial process to which the coolingtower assembly is to be matched. A few basic module sizes as prefabricated units are sufficieint to be combined as necessary to provide a wide range of desired cooling capacity. The size of these modules is such that they may be easily shipped and placed during assembly of the cooling tower. An extendible support means furthers this object as it reduces a module dimension for shipping.

BRIEF DESCRIPTION OF THE DRAWINGS

In the drawings,

FIG. 4 is a partial cross sectional view of a portion of the cooling tower moduleof FIG. 3;

FIG. 5 is a partial detail top plan view of a portion of a modular cooling tower showing means to attach adjacent modules;

FIG. 6 is a partial plan view of the water distribution headers of a modular cooling tower assembly;

FIG. 7 is a top plan view of an extended and secured leg of a modular cooling tower;

FIG. 8 is a partial detail elevational view of an extended and secured leg of FIG. 7; and FIG. 9 is a side view of the leg shown in FIG. 7.

DESCRIPTION OF THE PREFERRED EMBODIMENT

Figure 1:
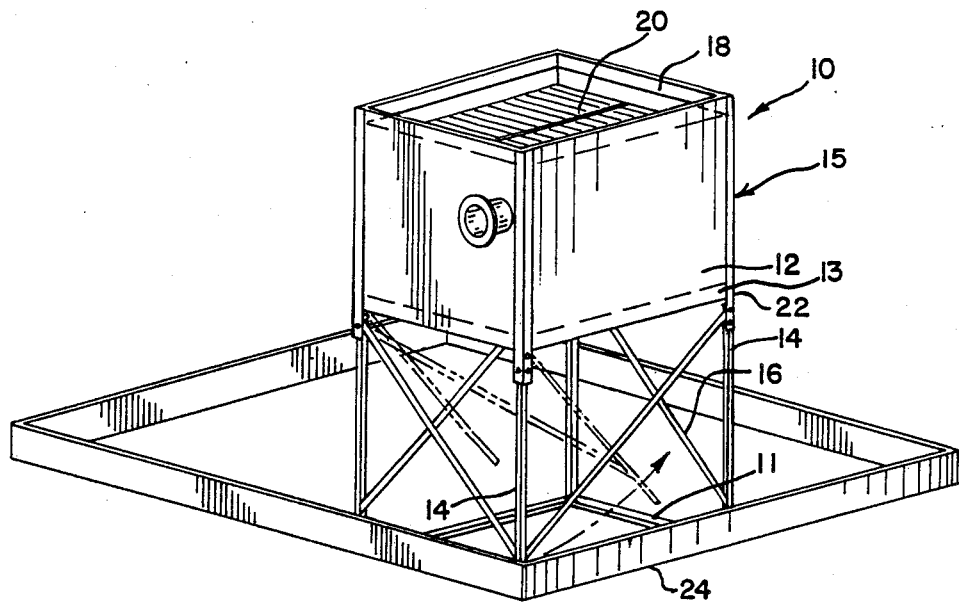
FIG. 1 is a perspective view of an embodiment of a cooling tower module.

Referring now to FIG. 1 of the drawings, a cooling tower module is shown generally at 10. Module 10 is comprised of a frame 15 which includes upper horizontal members 18, lower horizontal members 13 and vertical corner post members 22 that are interconnected to form a three-dimensional chamber. Side panels 12 may be comprised of corrosion resistant coated sheet metal, stainless steel or other noncorrosive materials such as structural plastic or fiberglass, and are affixed to the exterior sidess of module 10. If module 10 will have certain sides internally located in the assembled cooling tower, such internal walls will not receive a side panel 12. Legs 14 and cross braces 16 extend downwardly from the lower portion of vertical corner post membes 22 of frame 15. Paired legs 14 and cross braces 16 can be folded as a unit, as shown in dotted lines in FIG. 1, upwardly into the frame. The legs may be further tied together at their lower ends with horizontal rails 11 to provide more rigid support. When fully extended, legs 14 extend into basin 24 and support module 10 in a raised standing position. Alternatively, legs 14 can be designed to retract by telescoping, collapsing or simply be easily installed to or removed from the lower portion of vertical corner post members 22. Drift eliminators 20 are fixed at a position below the top opening defined by upper horizontal members 18 of module 10 and are used in limiting the amount of liquid droplets that exit with airflow upwardly from module 10. The upper horizontal member 18 of module 10 extends above drift eliminators 20 so as to define an empty zone.

Figure 2:
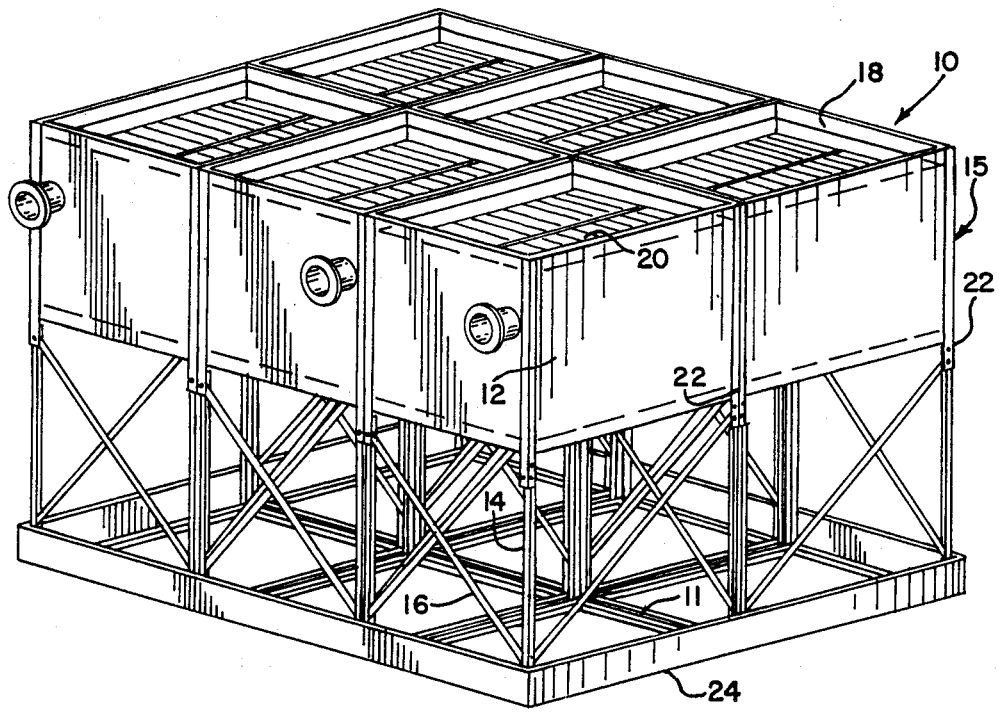
FIG. 2 is a perspective view of an embodiment of a modular cooling tower assembly in a partially assembled condition.

Referring now to FIG. 2, six cooling tower modules 10 are shown placed side by side in a two by three arrangement to form a modular cooling tower assembly. All cooling tower modules 10 are standing on their fully extended and secured legs 14 in a common basin 24. In assembling a modular cooling tower, modules 10 would usually be placed in basin 24 one at a time. On certain units, two modules 10 may be preassembled at a factory to form a shippable section. In this case, the modules will go in the basin two or more at a time. It is desirable to provide attaching means for joining adjacent modules together as a structural assembly shown in FIGS. 2 and 3. One form of attaching four adjacent cooling tower modules 17, 19, 21 and 23 is shown in FIG. 5. Corner post member 17a and upper horizontal member 17b of module 17 is shown attached to corner post member 21a and upper horizontal member 21b of module 21 with through bolt 25. In a like manner, corner post member 19a and upper horizontal member 19b of module 19 is shown attached to corner post member 23a and upper horizontal member 23b of module 23 with through bolt 27. Cooling tower modules 17 and 21 are spaced apart from cooling tower modules 19 and 23 by spacer channel member 29. Spacer channel member 29 is attached to modules 17 and 21 through bolt 31 and to modules 19 and 23 through bolt 33. The spacer channel members provide a spacing between two modules that permits minimum required access for hands and tools during mechanical attachment. The spacer channel members further transfer live structural loads across the entire modular cooling tower. Cooling tower modules 17 and 21 are further attached to cooling tower modules 19 and 23 through cross bolts 35 and 37. Fill sheets (not shown) may be inserted in the spacing created by spacing channel member 29 and the ends may be blocked by sealing panel strips (not shown).

Figure 3:
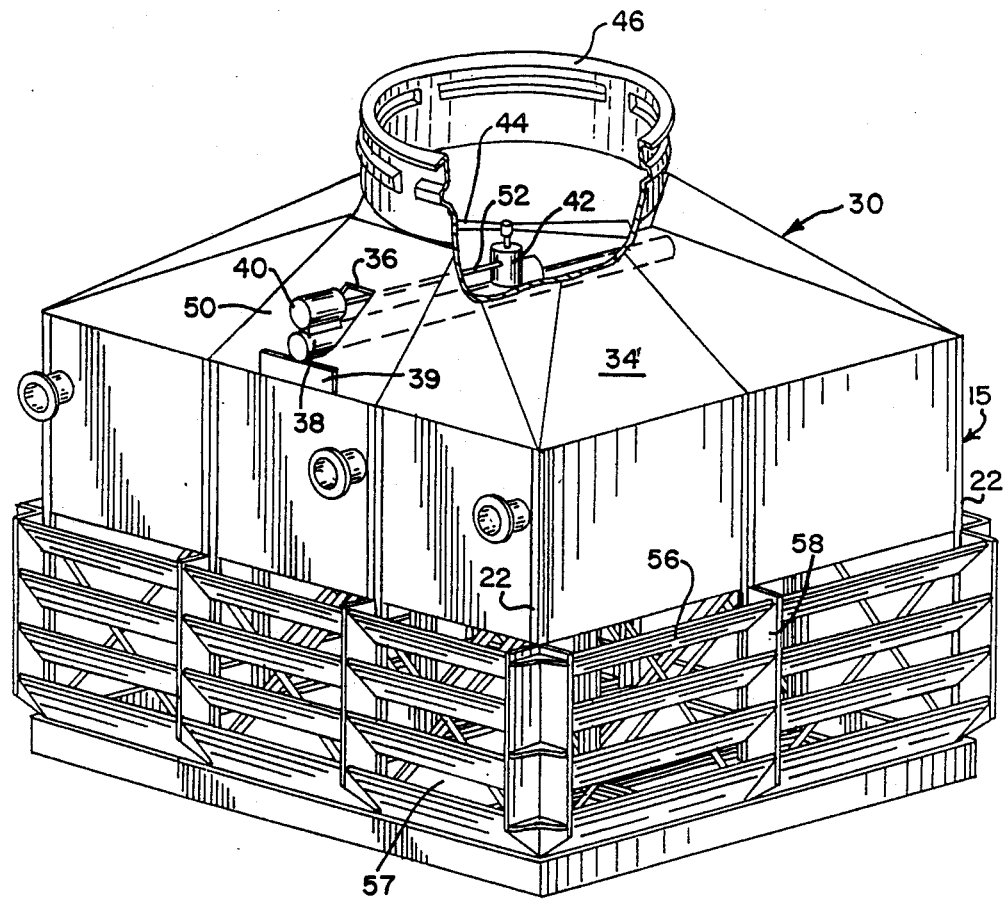
FIG. 3 is a perspective view of an embodiment of a modular cooling tower assembly in a completed condition.

FIG. 3 shows a completed modular cooling tower assembly which includes exit plenum chamber 30 on top of horizontal framing members 18 of assembled modules 10. Plenum chamber 30 is preferably comprised of fiber reinforced plastic molded sections 34 that can be readily emplaced on top of horizontal framing members 18, but also may be formed of other noncorrosive materials such as aluminum, steel or stainless steel sheets. The empty zone between the top of horizontal framing members 18 and the top of drift eliminator louvers 20 combined with the space within plenum chamber 30 forms the entire exit plenum space. Plenum chamber 30 includes side section 50 which has a slot 36 preferably extending through the bottom thereof. A beam 38 extends through slot 36 to the center of the assembled modules 10 and rests upon pedestal 39 that is placed on the top edge of upper horizontal members 18 prior to emplacement of the plenum chamber sections 34, 50. A motor 40 is affixed near an end of beam 38 exterior of plenum chamber 30, and a drive shaft 52 extends to fan gear housing 42 which is mounted on the beam 38 centrally of the plenum chamber 30. Fan blades 44 are mounted on a vertical shaft extending from fan gear housing 42. A circular cowl 46 extends around the top of plenum chamber 30 and forms a protective housing for fan blades 44.

For structural plastic or fiberglass plenum chambers, the cowl 46 may be formed integrally with plenum chamber sections. The plenum chamber 30 will usually have a square lower outer edge. If such a plenum chamber 30 is installed over a rectangular configuration of modules 10 having one dimension greater than chamber 30, the top surfaces of the outer edges of modules 10 may be blocked by panels laid across upper frame members outward of the chamber 30 to provide a generally square interior top opening to correspond to plenum chamber 30. The empty space provided by mounting the drift eliminators 20 a distance below the top opening of module 10 and upper horizontal members 18 will allow the air drawn upwardly through the outermost areas of fill sheets in modules 10 to flow into plenum chamber 30.

Inlet vanes 56 extend horizontally between vertical plates 58 and cover essentially the four outer areas of the modular cooling tower between the exterior legs 14 of an assembly of modules 10 thereby defining an air entrance plenum chamber 57 for incoming air. The vanes 56 and plates 58 may be prefabricated in units for assembly when the modules 10 are erected.

Referring now to FIG. 4, a detailed view of a portion of a cooling tower module 10 is shown as installed in a complete cooling tower assembly. Leg 14 is seen extended and secured in basin 24 with cross brace 16 and horizontal rail 11. Basin 24 is shown as a pan constructed with integral bottom and side walls containing a body of liquid 72 which drains from modules 10. It is to be understood that basin 24 may be otherwise constructed such as by a perimeter curb cast in place and with, or without, an impervious liner. Inlet vanes 56 are present on the exterior side of extended leg 14. Leg 14 extends from a pivotable connection at the lower end of vertical corner post member 22 of frame 15.

Spray headers 61 and branches 62 are hung from a section of frame 15 at a level to support drift eliminators 20 and typically comprise plastic of metal conduit. Spray nozzles 64 extend downwardly from spray branches 62 and are adapted to spray the liquid downwardly. Fill bundles are supported upon brackets at lower horizontal frame member 13. Fill sheets 68 are generally parallel rectangular plastic sheets that are spaced from each other by raised corrugations or sections 70 on each fill sheet 68. The liquid to be cooled is run through interconnected headers 61 into spraybranches 62 and exits spray nozzles 64. The liquid falls downwardly onto fill sheets 68 which cause the liquid to spread over the surface of each fill sheet 68. Fan 44 is designed to cause an updraft within module 10 thereby drawing air upwardly through inlet louvers 56 and between all fill sheets 68. The air exits the cooling tower assembly through drift eliminators 20 and out circular cowl 46. The liquid is accordingly cooled, with the heat contained in the liquid acting to warm the air which exits to the atmosphere through fan circle 46. The cooled liquid falls into basin 24 to form liquid level 72. The liquid is taken from basin 24 and reused in the desired process. As seenin FIG. 6, similar spray branches 62 are used in each of the modules 10 to assure an even spray of heated liquid over the combined fills 68 of all modules 10. Similarly, basin 24 collects the cooled liquid falling from all modules 10.

A preferred construction of the extendible leg feature of the present invention is shown in FIGS. 7, 8, and 9. Channel-shaped leg 14 having faces 14a, 14b and 14c is pivotally attached to the bottom portion of angled vertical corner post member 22 having faces 22b and 22c corresponding to leg faces 14b and 14c. A pivot pin 74 is fastened to leg face 14b in alignment with and extending through substantially vertical slot 75 of corner post face 22b. Pivot pin 74 and slot 75 are eccentric to the centerlines of leg face 14b and corner post face 22b allowing gravity to assist in bringing leg 14 into its fully extended position during unfolding. Preferably the pin 74 is a threaded bolt tack welded within aperture 81 of leg face 14b. Leg 14 is channel-shaped for rigidity although an L-or angle-shaped leg could also be used. Vertical corner post member 22 further includes substantially vertical slots 77 and 79 which are located on corner post faces 22b and 22c respectively. Pins 76 and 78 are located and tack welded within apertures 82 and 83 of leg faces 14b and 14c respectively in alignment with and extending through corresponding slots 77 and 79 of corner post faces 22b and 22c respectively when leg 14 is extended. To place leg 14 into its extended position in raised standing support of cooling tower module 10, leg 14 is simply pivoted from a folded position underneath module 10 to its extended position in which the top portion of leg 14 is received within the bottom portion of vertical cornerpost member 22 in a substantially juxtaposed parallel configuration. The angled lower edge of vertical corner post member 22 assists to guide locking pin 76 into slot 77. After leg 14 has been placed into its extended position, vertical corner post member 22 of cooling tower module 10 is lowered over leg 14 causing pins 74, 76 and 78 to slide upwardly into the top of slots 75, 77 and 79 respectively thus securely locking leg 14 in both forward-backward and side-to-side directions into its extended position in raised standing support of cooling tower module 10. To further securely lock legs 14 in their extended position, the pins 74, 76 and 78 may include outer fasteners, such as safety pins (not shown) or preferrably the pins 74, 76 and 78 may be threaded bolts, as shown, and threaded lock nuts may be secured thereon.

The foregoing description and drawings explain and illustrate the best known mode of the invention and those skilled in the art who have the disclosure before them will be able to make modifications and variations therein without departing from the scope of the invention which is defined in the following claims.

What is claimed is:

1. A modular cooling tower assembly comprising at least one cooling tower module, said cooling tower module comprising a frame in the form of a three-dimensional chamber having upper and lower horizontal members and vertical corner post members, drift eliminator means affixed within said frame at a level spaced below said upper horizontal member of said frame so as to provide an empty zone above said drift eliminator means, spray means affixed within said frame below said drift eliminator means, and fill means affixed within said frame below said spray means.

2. The modular cooling tower assembly of claim 1 wherein each of said cooling tower modules further comprises extendible support means located proximate said lower horizontal members of said frame, said extendible support means being movable between a first position adjacent said lower horizontal membersof said frame and a second extended position to maintain said cooling tower module in a raised standing position abovea supporting surface.

3. The modular cooling tower assembly of claim 2 wherein said extendible support means includes legs that are pivotally attached to the corresponding lower portions of the vertical corner post members of said frame by pivot means for alternatively supporting said cooling tower module in a raised standing position above said supporting surface, and pivotally rotating up into a folded position underneath said frame for transportation and storage.

4. The modular cooling tower assembly of claim 3 further comprises locking means positioned between said lower horizontal membersof said frame and said legs for locking said cooling tower modules in said raisedstanding position above said supporting surface in order to avoid collapse.

5. The modular cooling tower assembly of claim 3 wherein said pivot means comprisesa pin member penetrating each of said lower portions of said vertical corner post members and said legs, proximate to the region of pivotal attachment therebetween, said pin member permitting controlled pivotal rotation of said legs relative to the fixed position of said vertical cornerpost members.

6. The modular cooling tower assembly of claim 4 wherein said locking means comprises substantially vertical slots in both faces of said lower edges of said vertical corner post members corresponding to apertures in said legs when said cooling tower modules are in their raised standing position, said locking means furthr comprising pin members located within each of said corresponding frame slots and leg apertures for slidable receipt within said frame slots from a lower unlocked position to an uper locked position upon lowering of said vertical corner post members relative to said legs for securely locking said legs in both the forward-backward and side-to-side directions.

7. The modular cooling tower assembly of claim 3 further comprising an inlet van means adjacent certain legs of said cooling tower assembly.

8. The modular cooling tower assembly of claim 1 wherein said spray means comprise a header having branch lines with nozzles in each of said branch lines.

9. The modular cooling tower assembly of claim 1 wherein said fill means comprise a series of generally rectangular, thin plastic sheets parallel to each other.

10. The modular cooling tower assembly of claim 1 wherein more than one of said cooling tower modules are combined in side-by-side relationship to form said cooling tower assembly.

11. The modular cooling tower assembly of claim 10 wherein each of said cooling tower modules further includes attaching means on said frame so as to provide for secure attachment to other similar cooling tower modules.

12. The modular cooling tower assembly of claim 11 wherein said attaching means comprises aligned apertures in each of said frames of said abutting cooling tower modules for insertion of a fastener such as a pin for secure attachment therebetween.

13. The modular cooling tower assembly of claim 10 wherein certain of said cooling tower modules further includes spacing means on said frame so as to provide for spaced attachment to certain other similar cooling tower modules.

14. The modular cooling tower assembly of claim 13 wherein said spacing means comprises a spacer channel member for attachment between said cooling tower modules.

15. The modular cooling tower assembly of claim 1 wherein a single exit plenum chamber is fitted on top of said modular cooling tower assembly.

16. The modular cooling tower assembly of claim 15 wherein said exit plenum chamber includes a single fan to draw air upwardly and out of said modular cooling tower assembly.

17. The modular cooling tower assembly of claim 1 further comprises an entrance plenum chamber for incoming air werein inlet vanes surround the extended legs of the cooling tower module sides facing an outer edge of said modular cooling tower assembly.

18. The modular cooling tower assembly of claim 1 wherein said assembly is stood in a single basin to allow the collection of liquid exiting said spray header assembly and fill assembly.

19. A method of assembling a modular cooling tower assembly comprisingthe following steps:
 positioning at least one cooling tower module including a frame in the form of a three dimensional chamber having upper and lower horizontal members and vertical corner post members, a drift eliminator assembly within said frame at a level spaced below said upperhorizontal member of said frame, a spray header assembly within said frame below said drift eliminator assembly, a fill assembly within said frame below said spray header assembly, and side panels on certain external sides of said modularcooling tower assembly;
 extending legs beneath said frame to support said modular cooling tower assembly;
 emplacing a single air exit plenum chamber above said modular cooling tower assembly;
 mounting a single fan assembly within said plenum chamber;
 forming a single air entrance plenum chamber below said modular cooling tower assembly; and
 constructing a common basin around said legs and beneath said fill assembly for the collection of liquid exiting said spray header assembly and fill assembly.

20. The method of claim 19 wherein said legs are pivotally extended from the lower portion of said vertical corner post members of said frame and locked to support said modular cooling tower assembly in a raised standing position above a supporting surface.

21. The method of claim 19 wherein a plurality of cooling tower modules are arranged and attached in a side by side assembly.

22. A modular cooling tower assembly comprising at least one cooling tower module, each of said cooling tower modules comprising a frame in the form of a three-dimensional chamber having upper and lower horizontal members and vertical corner post members, drift eliminator means affixed within said frame at a level spaced below said upper horizontal member of said frame so as to provide space above said drift eliminator means, spray means affixed within said frame below said drift eliminator means, fill means affixed within said frame below said spray means, attaching means on said frame so as to provide for secure attachment to other similar cooling tower modules, spacing means on certain of said frames so as to provide for spaced attachment to certain other similar cooling tower modules, extendible support means located proximate said lower horizontal member ofsaid frame which are movable between a first position adjacent said lower horizontal member of said frame and a second extended position to maintain said cooling tower module in a raised standing position above a supporting surface, locking means positioned between said lower horizontal member of said frame and said legs for locking said cooling tower module in said raised standing position above said supporting surface to avoid collapse, a plurality of cooling tower modules assembled and attached in a side by side relation, a single plenum chamber affixed to said upper edge of said frame of said plurality of cooling tower modules, a single fan affixed to said plenum chamber, and a single basin in which said extended support means of said cooling tower modules stand to catch liquid exiting said spray header means and said fill means ofsaid modular cooling tower assembly.

* * * * *